Patented Sept. 28, 1943

2,330,504

UNITED STATES PATENT OFFICE 2,330,504

DISPERSION OF POLYISOBUTYLENE IN AQUEOUS MEDIUMS

Gerry P. Mack, Jackson Heights, N. Y.

No Drawing. Application March 29, 1941,
Serial No. 385,866

5 Claims. (Cl. 260—8)

The present invention pertains to the dispersion of polyisobutylene in water and more particularly to the dispersion in water of polyisobutylene which is of such a high molecular weight that it is of a resilient and elastic nature.

It is known that polyisobutylene can be obtained in molecular weights ranging upward from a molecular weight of about 3000. In the range of from 3000 to about 7000, the polymer is in the form of a thick viscous liquid. Polymers of a molecular weight of from about 10,000 to about 27,000 are viscous to somewhat plastic in nature. Polymers of a molecular weight in excess of 27,000 are resilient and elastic and in this respect resemble rubber. The production of polymers of a molecular weight in excess of 27,000 is disclosed in U. S. Patent No. 2,203,873.

The polymers of a molecular weight below about 7000 are emulsified rather easily by use of the methods known to the art for dispersing waxes, resins, and the like, in water. However, polymers of a molecular weight greater than 7000 are very difficult to disperse in water, because they are extremely hydrophobic and repel water to a very high degree. This characteristic feature of the higher weight polymers has led to the perfection of numerous methods of producing aqueous emulsions of the polymers. Among such methods is that involving a milling of the polymer with a conjunctive agent, such as rubber, asphalt, and the like, and a dispersing of the resulting mixture in water by means of dispersing agents comprising soaps of fatty acids. It has been proposed in such processes to also utilize protective colloids, and among the protective colloids proposed for this purpose is casein.

I have now found that polyisobutylene having a molecular weight in excess of about 7000 and preferably above about 27,000, can be readily dispersed in water without resort to a conjunctive agent with casein as the sole dispersing agent. The object and purpose of my invention are accordingly the dispersion of polyisobutylene of high molecular weight in water, solely by working the polyisobutylene in water in the presence of casein as the sole dispersing agent and of an alkali or borax as solubilizing agent for the casein.

In carrying out my invention, the polyisobutylene is first worked by milling or kneading. The casein, alkali or borax and water are then added and the mixture worked until inversion of the mixture occurs. Any alkali may be used to effect solution of the casein, and in this connection there may be mentioned sodium hydroxide, potassium hydroxide, sodium carbonate, potassium carbonate, and the like. I have found, however, that it is preferable to work with borax, because of its lower basicity. The amount of alkali or borax to be added is, of course, dependent upon the amount of casein and should be sufficient to insure complete dissolution of the casein. On the other hand, the amount of casein will vary depending upon the quantity of isobutylene to be dispersed, and for best results I suggest an amount of casein of about 8%, based on the weight of the polyisobutylene to be emulsified. The amount of water which will be employed will depend upon the concentration of the emulsion, which the operator desires, but it is recommended that the emulsions according to the invention be not diluted belond 50%, since dilution beyond this point often causes excessive creaming. If desired, there may be employed a preservative for the casein, for example pentachlorphenol and similar substances, such as sodium pentachlorphenate. However, these ingredients are not necessary, and their use can be omitted without impairing the results obtained.

My invention is further illustrated by the following examples, in which the parts are by weight. It is to be understood, however, that the examples are to be considered as illustrative and not limitative.

Example 1

| | Parts |
|---|---|
| Polyisobutylene polymer (mol. wt. 50,000) | 665 |
| Casein | 54 |
| Borax | 8 |
| Water | 650 |

The polymer is charged into an internal type of mixer, such as the Banbury or Werner and Pfleiderer type. The polyisobutylene is then kneaded for about 5 minutes after which the borax is added, and this mixture is worked for another 10 minutes. At the end of this time, there is added in 10 gram portions a casein suspension, having a ratio of 1 part of casein to 9 parts of water, which has been previously mixed in warm water and allowed to stand for about half an hour. This casein suspension is worked in as rapidly as the mass will absorb it. The first additions are spaced about 5 minutes apart, which is about the time required for the mass to unite, for after each addition there is a "crumbling effect." Later on, the polymer mass readily absorbs the casein dispersion, and when all of it has been absorbed, there is an inversion of phases, and the polyisobutylene is now in the dispersed phase and water in the continuous phase. The dispersion may then be diluted with further additions of water. It is preferable to maintain the water phase at about 50%, as greater dilution than this causes excessive creaming. A suitable preservative for casein, such as sodium pentachlorphenate may be added, if desired.

*Example 2*

The process is the same as in Example 1, except that a polymer of 28,000 molecular weight is employed.

*Example 3*

The proportions are the same as in Example 1. However, the casein is first milled into the polyisobutylene of a molecular weight of 93,000, on a standard rubber mill. The mixture so obtained is then charged into an internal type of mixer and a 10% borax solution is slowly added in the manner in which the casein was added in Example 1. It will be found that the inversion of the mixture occurs at a concentration of the water phase of about 40%.

The aqueous dispersions obtained according to the present invention may be employed in the coating art, for plasticizing natural and synthetic rubber latices, and the like, as disclosed in my co-pending application Serial No. 332,699, filed May 1, 1940.

Various modifications of the invention will occur to those skilled in the art and I, therefore, do not intend to be limited by the patent granted, except as provided by the claims appended.

What I claim is:

1. A process of producing aqueous dispersions of polyisobutylene, having a molecular weight in excess of about 7000, which consists in kneading polyisobutylene, adding thereto as sole dispersing agent a quantity of casein equal to about 8% by weight of the polyisobutylene and a sufficient amount of a substance selected from the group consisting of the alkalis and borax to solubilize the casein, and working the mixture with water until inversion occurs.

2. The process as defined in claim 1, wherein the polymer has a molecular weight in excess of 27,000.

3. The process of producing aqueous dispersions of polyisobutylene, having a molecular weight in excess of 7000, which consists in kneading the polymer, adding thereto as sole dispersing agent a quantity of casein equal to about 8% by weight of the polyisobutylene, and kneading the mixture of polymer and casein, and adding a 10% solution of borax in water in stages while working the mixture until inversion thereof occurs.

4. An aqueous dispersion of polyisobutylene consisting of polyisobutylene, having a molecular weight in excess of 7000, water, a quantity of casein equal to about 8% by weight of the polyisobutylene and a solubilizing agent for the casein selected from the class consisting of the alkalis and borax, the casein serving as the sole emulsifying agent and as protective colloid for the polyisobutylene dispersion.

5. The process of producing aqueous dispersions of polyisobutylene having a molecular weight in excess of 7000, which consists in kneading the polymer, adding thereto a quantity of borax equal to about 1.2 percent by weight of the polymer, kneading the mixture of polymer and borax, and adding in stages an aqueous suspension of a quantity of casein equal to about 8% by weight of the polyisobutylene while working the mixture until inversion thereof occurs.

GERRY P. MACK.